US006985988B1

(12) United States Patent
Nsame

(10) Patent No.: US 6,985,988 B1
(45) Date of Patent: Jan. 10, 2006

(54) SYSTEM-ON-A-CHIP STRUCTURE HAVING A MULTIPLE CHANNEL BUS BRIDGE

(75) Inventor: Pascal A. Nsame, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 09/708,494

(22) Filed: Nov. 9, 2000

(51) Int. Cl.
*G06F 13/14* (2006.01)

(52) U.S. Cl. ..................... 710/305; 710/306
(58) Field of Classification Search ............... 710/100, 710/306, 305, 240–244, 4; 714/30
See application file for complete search history.

(56) References Cited

U.S. PATENT DOCUMENTS

| 5,438,681 A | 8/1995 | Mensch, Jr. |
| 5,455,525 A | 10/1995 | Ho et al. |
| 5,761,516 A | 6/1998 | Rostoker et al. |
| 5,838,684 A | 11/1998 | Wicki et al. |
| 5,842,031 A | 11/1998 | Barker et al. |
| 5,872,942 A * | 2/1999 | Swanstrom et al. ........ 710/305 |
| 6,035,364 A | 3/2000 | Lambrecht et al. |
| 6,047,350 A * | 4/2000 | Dutton et al. ............... 710/313 |

* cited by examiner

*Primary Examiner*—Tim Vo
*Assistant Examiner*—Kim T. Huynh
(74) *Attorney, Agent, or Firm*—McGinn & Gibb, PLLC; Richard A. Henkler, Esq.

(57) ABSTRACT

A system-on-a-chip integrated circuit structure includes a bridge having a plurality of channels, a processor local bus connected to the bridge (wherein the bridge includes a first channel dedicated to the processor local bus), at least one logic device connected to the processor local bus, a peripheral device bus connected to the bridge (wherein the bridge includes a second channel dedicated to the peripheral device bus), at least one peripheral device connected to the peripheral device bus, at least one memory unit connected to the bridge (wherein the bridge includes a third channel dedicated to the memory unit), and at least one input/output unit connected to the bridge (wherein the bridge includes a fourth channel dedicated to the input/output unit).

27 Claims, 4 Drawing Sheets

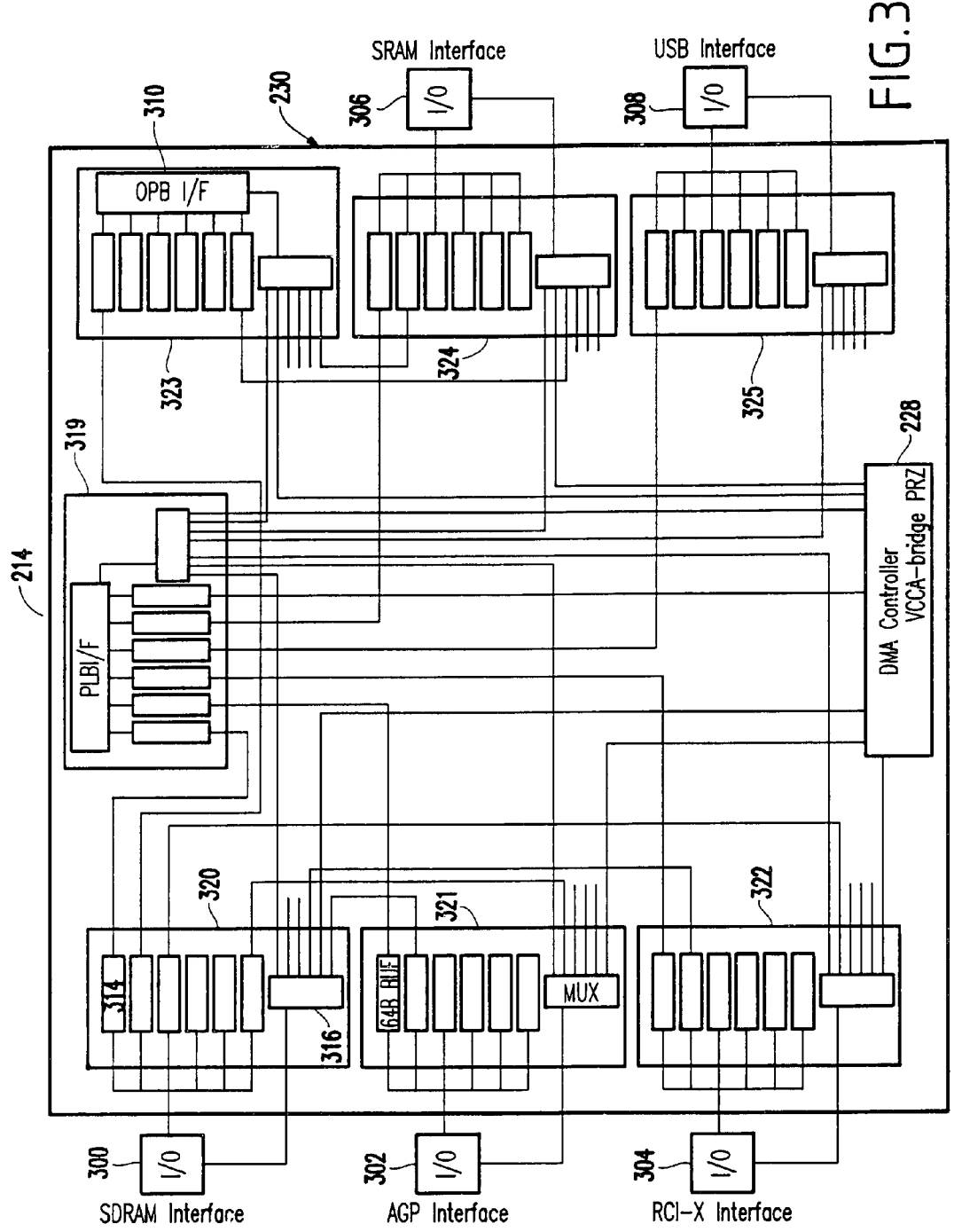

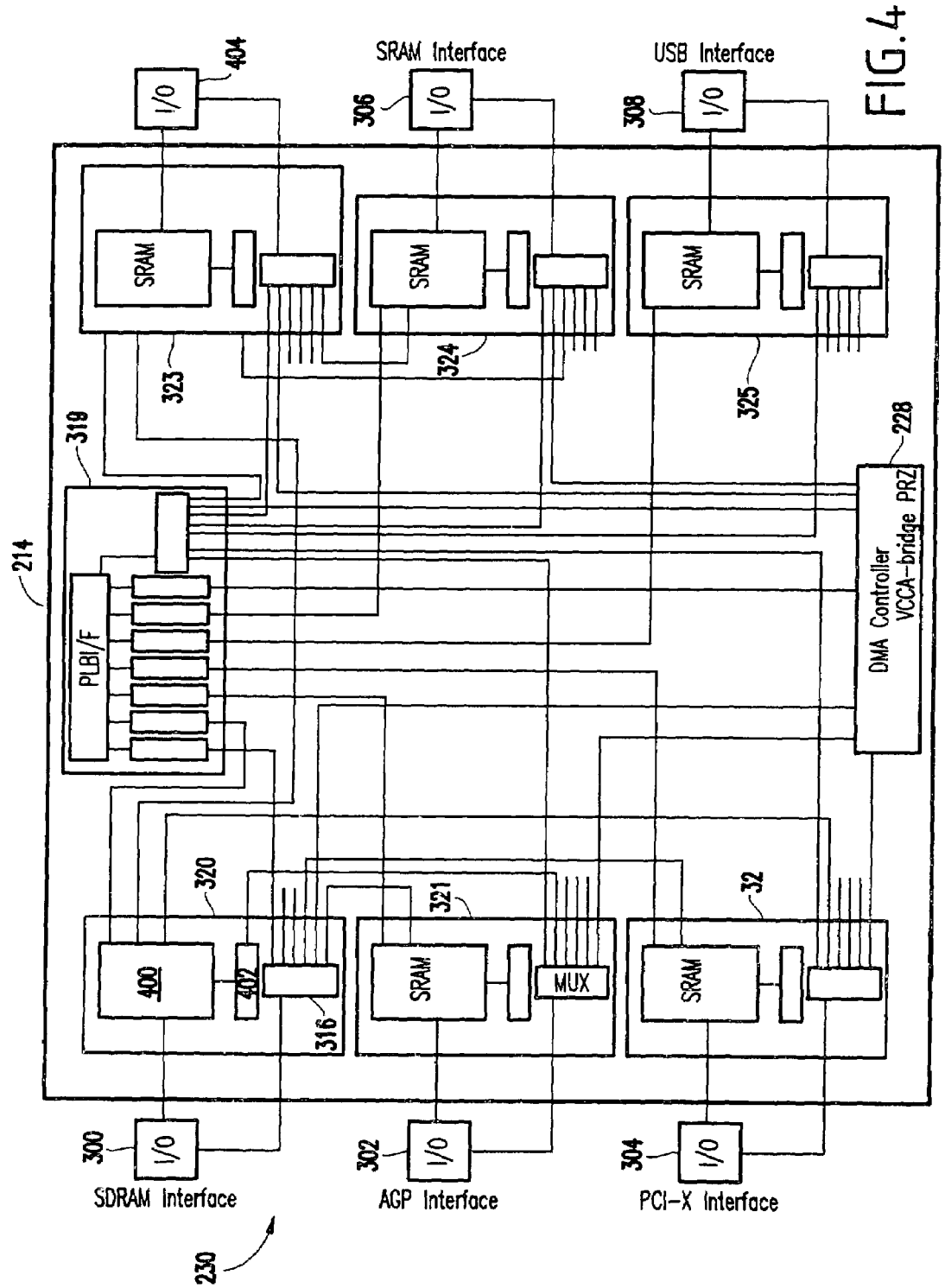

SYSTEM-ON-A-CHIP STRUCTURE HAVING A MULTIPLE CHANNEL BUS BRIDGE

BACKGROUND OF THE INVENTION

1. Field of the Invention

The present invention generally relates to System-on-a-Chip architecture and more particularly to an improved bridge that provides multiple virtual channels for the devices connecting to the bridge to reduce latencies.

2. Description of the Related Art

Conventional component-based System-on-a-Chip (SoC) communication architectures achieve poor performance. This is primarily due to the blocking nature of their on-chip communication structures associated with handshake protocols, interconnecting processors and their peripheral Intellectual Property (IP) blocks, which induces latencies that degrade performances of bus system hierarchies. Existing chipset bridges connect processors running at clock speeds of 500 MHz or more to system memories and to I/O's that operate at much lower speed, typically below 100 MHz. Conventionally, the main memory subsystems (fast DRAM) offer high throughput, but they often require several system clock cycles of latency. To go beyond 100 MHz bus speed, the choice of electrical interfaces has to evolve to lower voltage swings than the Low Voltage Transistor Transistor Logic (LVTTL) used conventionally. Increasing the frequency is very hard, and strictly relying on it is not a practical solution. In a telecommunication application, such as a router or a switch, a lot of data is exchanged between the I/Os sitting on the Peripheral Component Interface (PCI) buses and the memory. Due to the hierarchical approach in conventional systems, the I/Os on secondary buses cannot access the main memory with high efficiency, since they must first gain access to the secondary and then to the primary PCI bus.

Improvements to the CPU's processing power result in requirements for more bandwidth, and real time applications impose low latencies. For example, an Ethernet LAN adapter card for the 10/100 MBps uses a 32-bit PCI bus for data transmission to the host CPU, but gigabit LANs would stress such buses beyond their capabilities. Also, the memory of a PowerPC host bus allows 800 MBps of data transfer. The maximum theoretical bandwidth of a 32-bit PCI at 33 MHz is, 132 MB, and a 64-bit PCI can read 528 MBps, if it is clocked at 66 MHz. Therefore, there is a need to optimize bandwidth utilization of these buses and the invention discussed below addresses theses needs.

SUMMARY OF THE INVENTION

It is, therefore, an object of the present invention to provide a System-on-a-Chip integrated circuit structure that includes a bridge having a plurality of channels, a processor local bus connected to the bridge (wherein the bridge includes a first channel dedicated to the processor local bus), at least one logic device connected to the processor local bus, a peripheral device bus connected to the bridge, (wherein the bridge includes a second channel dedicated to the peripheral device bus), at least one peripheral device connected to the peripheral device bus, at least one memory unit connected to the bridge (wherein the bridge includes a third channel dedicated to the memory unit), and at least one input/output unit connected to the bridge (wherein the bridge includes a fourth channel dedicated to the input/output unit).

The channels includes buffer memories for storing data when a previous data transfer is being performed, such as first in-first out and multi-port SRAM buffer memories. Each of the channels also includes a multiplexor for selectively connecting to other channels.

The memory unit can be static random access memory (SRAM), synchronous dynamic random access memory (SDRAM), multi-port SRAM, etc., each of which is connected to a different unique dedicated channel in the bridge. The input/output units can be a peripheral interface, graphics interface, serial bus interface, etc. that are each connected to unique dedicated channels in the bridge. The peripheral devices can be a serial connection, network interface connection, programmable input/output connection, etc., each connected to the peripheral device bus.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a schematic diagram of one embodiment of an inventive bridge; and

FIG. 4 is a schematic diagram of one embodiment of an inventive bridge.

DETAILED DESCRIPTION OF PREFERRED EMBODIMENTS OF THE INVENTION

Figure 1:
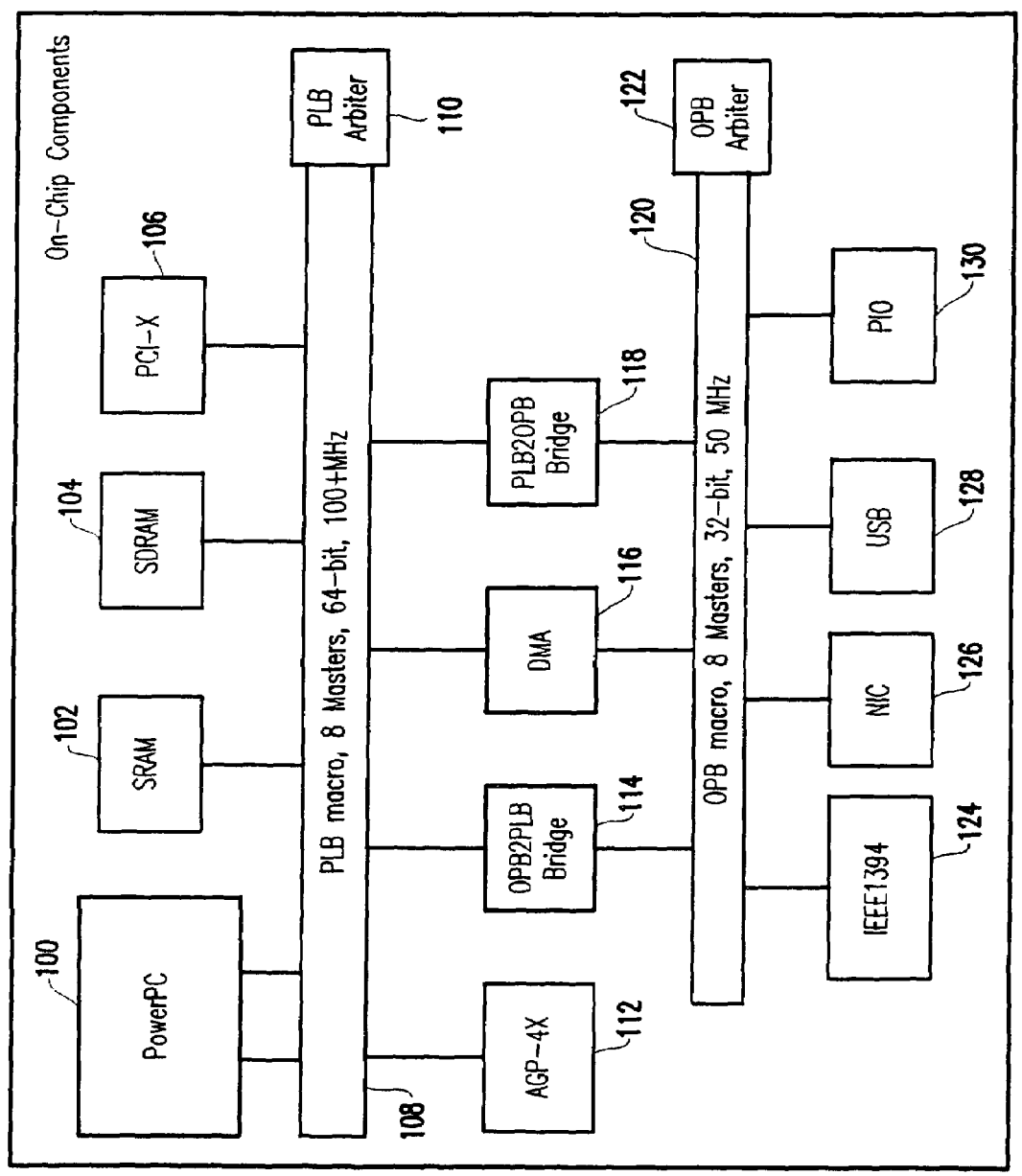
FIG. 1 is a schematic diagram of a chip having peripheral devices connected to a common bus and bridge.

Referring now to the drawings, and more particularly to FIG. 1, a first System-on-a-Chip (SoC) system is illustrated that includes two buses, a processor local bus (PLB) 108 and an on-chip peripheral bus (OPB) 120. One or more logic devices 100 (such as the PowerPC available from IBM Corporation, Armonk N.Y., USA), are connected to the processor local bus 108. Additionally, memory devices, such as a static random access memory (SRAM) 102 and synchronous dynamic random access memory 104 (SDRAM) are connected to the processor local bus 108. Further, other peripheral interfaces, such as the peripheral component interface (PCI) and an advanced graphic pod (AGP) 112 are connected to the processor local bus 108. Various peripheral devices such as the IEEE1394 serial interface 124, network interface card (NIC) 126, universal serial bus (USB) 120, and a programmable input/output (PIO) are connected to the on-chip peripheral bus 120.

In operation, the PLB arbiter 110 and the OPB arbiter 122 control access to the buses 108, 120. For example, if the logic device 100 transferred data to the network interface card 126, the PLB arbiter 110 would block all other access to the PLB 108 and the data would flow over the PLB the PLB2OPB bridge 118 with the assistance of the DMA engine 116. In a similar manner the OPB arbiter 122 would block all other data from the OPB 120 so that the data could be transferred to the network interface card 126. The OPB2PLB bridge 114 would be used in a similar manner to transfer data back from the NIC 126 to the logic unit 100.

With the structure shown in FIG. 1, the arbiters 110, 122 restrict access to the buses 108, 120. Therefore, with the structure shown in FIG. 1, each of the devices connected to a bus must wait for the bus to finish transmitting other data before it can transmit data over the bus (or between the buses). This blocking increases latencies and slows the circuit's operations considerably.

Figure 2:
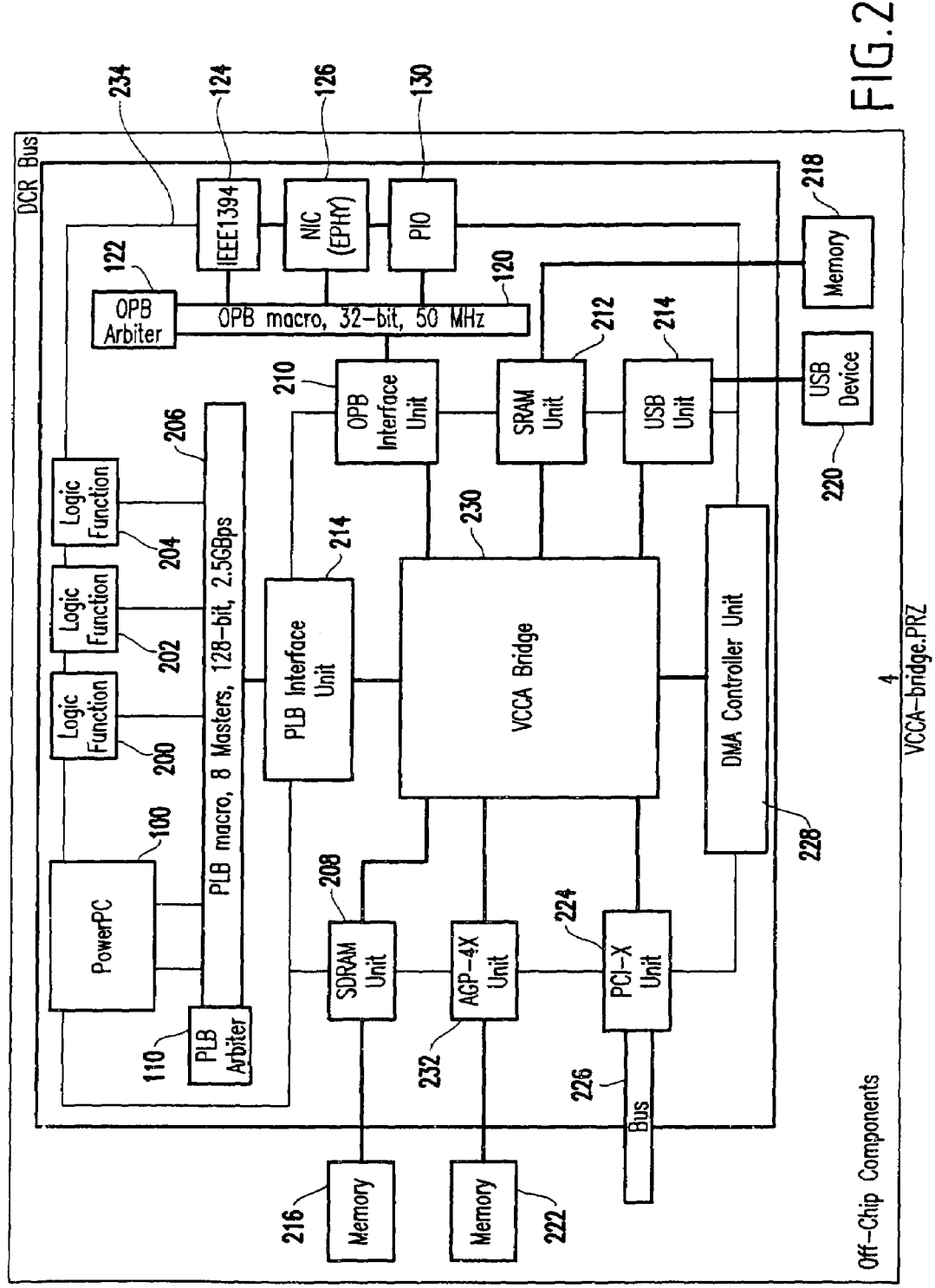
FIG. 2 is a schematic diagram of a chip having peripheral devices connected to a common bus and bridge.

FIG. 2 illustrates a structure that is designed to reduce the latencies and increase communication speed on a SoC device. Similar items discussed above with respect to FIG. 1 are labeled with identical numbers in FIG. 2 and a redundant discussion of the same is omitted.

One important difference with the structure shown in FIG. 2 is the VCCA bridge 230. Two embodiments of the VCCA bridge 230 are shown in FIGS. 3 and 4 and are discussed below. The structure in FIG. 2 also has a SDRAM unit 208, an AGP unit 232, a PCI controller 224, a USB unit 214, and a SRAM unit 212 that are directly connected to the VCCA bridge and are not connected to a bus as they are in FIG. 1.

In addition the PLB 206 and the OPB 120 are connected to the VCCA bridge 230 by interface units 214 and 210, respectively. In a similar manner to the structure shown in FIG. 1, both buses 206, 120 include arbiters 110, 122. The various serial, network and programmable interfaces 124, 126, and 130 are connected to the OPB 120 in the structure shown in FIG. 2. Also, the DMA controller 228 is connected directly to the VCCA bridge 230.

FIG. 2 also illustrates the PCI controller bus 226 which connects to the PCI controller 224, the graphics unit 222 which connects to the AGP unit 232, as well as the memories 216, 218 that are connected to the SDRAM unit 208 and the SRAM unit 212. Similarly the USB device 220 is illustrated as being connected to the USB unit 214.

Further, FIG. 2 illustrates a structure that includes the logic device 100 mentioned with respect to FIG. 1 and additional logic function units 200, 202, 204. The device control register (DCR) bus 234 allows the various units to send control information to each other, but at low speeds/low bandwidths.

As shown in FIG. 3, the bridge includes many dedicated channels 319–325. Each dedicated channel is uniquely connected to a different functional element (such as buses, memory units, interface units, etc.) within the SoC. While 7 channels are illustrated in FIG. 3, as would be known by one ordinarily skilled in the art, the number of channels can be increased or decreased depending upon the specific requirements of the circuit.

Channel 319 is connected to the PLB 206 through an interface unit 214. Similarly, channel 320 is connected to the SDRAM unit 208 through an interface 300. Channel 321 is connected to the AGP unit 232 through an interface 302. Channel 322 is connected to the PCI controller 224 through an interface 304. Channel 323 is connected to the OPB 120 through an interface 310. Channel 324 is connected to the SRAM unit 212 through an interface 306. In a similar manner, channel 325 is connected to the USB unit 214 through an interface 308.

Every one of the channels 319–325 includes a multiplexor 316 and buffer memories 314. In a preferred embodiment, the buffer memories 314 comprise first-in, first-out (FIFO) memories.

In operation, the multiplexors 316 direct data flow (with the assistance of the DMA controller 228) from one channel to another channel. Therefore, for example if a data request for data from the SRAM memory 218 appeared on peripheral bus 226 (shown in FIG. 2), the request would be processed through the PCI controller 224 and the interface 304 to channel 322. The multiplexor 316 within channel 322 would direct the request to the SRAM Channel 324. In this way, the invention avoids the use of a data bus in many situations. This eliminates the blocking problem discussed above because, with the structure shown in FIGS. 2–4, data transfers can occur simultaneously between multiple pairs of channels. For example, channel 320 could be communicating with channel 319 at the same time channel 325 is communicating with channel 322. The buffer memories 314 are utilized to store data transfers if one channel is currently being used for a previous data transfer.

In another example, if a logic function 200 desire to process data through the USB unit 214, the data request would be processed through the PLB 206 as authorized by the PLB arbiter 110. The request then would proceed through the PLB interface unit 214. Then, the multiplexor 316 in channel 319 would direct the data request to channel 325. If channel 325 was immediately available the data request would be process directly through interface 308 to and the USB unit 214. To the contrary, if another channel was currently utilizing channel 325, the data request would be processed through the buffers 314 in channel 325 prior to being processed through the interface 308.

Therefore, with the above structure, each processing unit connected to the VCCA bridge 230 appears to have a dedicated channel to each other device and bus. Therefore, the channels appear as virtual channels to the attached processing units. In other words, the PCI controller 224 appears to have a dedicated virtual channel to the PLB 206. The same virtual dedicated channels appear to all device connected to the VCCA bridge 230.

FIG. 4 illustrates another embodiment of the VCCA bridge 230. In this embodiment, each of the channels 319–325 includes multi-port SRAM units 400 and a single buffer 402 in place of the FIFO buffers 314 discussed with respect to FIG. 3. The structure in FIG. 4 is based on the use of a multi-port SRAM as opposed to a FIFO therefore, the buffer size and buffer configuration are programmable by the user during the design synthesis and optimization of the VCCA brdige architecture. This gives the system architect more flexibility during the architectural exploration/performance evaluation phase of a VCCA-based design. It also offers some bandwidth improvements due to avoiding a multiplexor for each channel.

As discussed above, most shared bus system interfaces are inherently blocking, because of their handshaking protocol. This limits the effectiveness of today's high-performance embedded processors in several ways. To improve performance, future bus interfaces should appear to their masters more like dedicated resources than like shared interfaces. Thus, the invention provides the system architecture shown in FIGS. 2–4 that addresses communication related performance bottlenecks.

The invention provides non-blocking communication through multiple reserved lanes (e.g., channels 319–325) managed by an implicit protocol (e.g., buffers 314 and multiplexors 316). The invention avoids relying on handshaking signals that leads to blocking communications when a destination or a shared resource is overloaded.

The virtual channel communication architecture (VCCA), shown in FIGS. 2–4, provides application specific bus interface flow control, by coordinating the access of resource competing components using reserved lanes. The virtual channel scheduler module uses multiple FIFO buffers 314, dedicated to distinct virtual channels 319–325, to allow the invention to implement the required multiple reserved lanes.

Transactions occurring on each port interface may be routed to adjacent ports without having to pass through a bus. Similarly, each port has a data-path dedicated to the processor local bus 206.

The invention is especially important because, for systems interconnected through a shared bus interface, when more than two bus masters are active, the effective bandwidth of each access is significantly reduced compared to the maximum bandwidth observed when only one bus master is active. Furthermore, if concurrent accesses are not coordinated, one or more bus master may incur an unacceptable latency due to busy wait signals. This latency is even longer when access is required across a bus bridge.

By adding hardware support for non-blocking inter-virtual component communication, in the form of the VCCA bridge 230, the invention improves the performance of embedded systems. Such performance gains allow concurrent computations to utilize nearly all the available bus bandwidth while satisfying real-time requirements through the use of dedicated channels for each interface. The VCCA bridge 230 provides a performance boost on embedded systems in which there are contentions for communication resources (e.g. shared bus bandwidth, FIFO buffer) among application components.

Furthermore, the VCCA bus bridge's 230 ability to exploit a large processor local bus bandwidth is relatively independent of the processor's access pattern or the number of streams in a given computation. The VCCA bridge 230 configured with appropriate FIFO 314 depths, can generally exploit the full available processor local bus bandwidth.

The VCCA architecture 230 described here is integrated onto the processor chip and implements a fairly simple scheduling scheme. More sophisticated access ordering mechanisms are certainly possible, as would be known by one ordinarily skilled in the art given this disclosure.

While the invention has been described in terms of preferred embodiments, those skilled in the art will recognize that the invention can be practiced with modification within the spirit and scope of the appended claims.

What is claimed is:

1. A system-on-a-chip integrated circuit structure comprising:
    a bridge having a plurality of channels in said bridge;
    a processor local bus connected to said bridge, wherein said bridge includes a first channel dedicated to said processor local bus;
    at least one logic device connected to said processor local bus;
    a peripheral device bus connected to said bridge, wherein said bridge includes a second channel dedicated to said peripheral device bus;
    at least one peripheral device connected to said peripheral device bus;
    at least one memory unit connected to said bridge, wherein said bridge includes a third channel dedicated to said memory unit; and
    at least one input/output unit connected to said bridge, wherein said bridge includes a fourth channel dedicated to said input/output unit.

2. The structure in claim 1, wherein each of said channels includes buffer memories adapted to store data when a previous data transfer is being performed.

3. The structure in claim 2, wherein said buffer memories comprise first-in first-out buffer memories.

4. The structure in claim 1, wherein each of said channels includes a multi-port static random access memory (SRAM) adapted to store data when a previous data transfer is being performed.

5. The structure in claim 1, wherein each of said channels includes a multiplexor adapted to selectively connect to other channels.

6. The structure in claim 1, wherein said at least one memory unit comprises a first-type memory unit and a second-type memory unit different than said first-type memory unit, wherein said third channel is dedicated to said first-type memory unit and said bridge includes a fifth channel dedicated to said second-type memory unit.

7. The structure in claim 6, wherein said first-type memory unit comprises static random access memory (SRAM) and said second-type memory unit comprises synchronous dynamic random access memory (SDRAM).

8. The structure in claim 1, wherein said at least one input/output unit comprises one or more of a peripheral interface, graphics interface, and serial bus interface, and wherein said bridge includes dedicated channels for each of said peripheral interface, graphics interface, and serial bus interface.

9. The structure in claim 1, wherein said at least one peripheral device includes one or more of a serial connection, network interface connection, and programmable input/output connection each connected to said peripheral device bus.

10. A system-on-a-chip integrated circuit structure comprising:
    A bridge having a plurality of channels;
    At least one bus connected to a unique dedicated channel in said bridge;
    At least one memory unit connected to a unique dedicated channel in said bridge; and
    At least one input/output unit connected to a unique dedicated channel in said bridge;
    Wherein said at least one bus includes;
        A processor local bus connected to said bridge, wherein said bridge includes a first channel dedicated to said processor local bus; and
        A peripheral device bus connected to said bridge, wherein said bridge includes a second channel dedicated to said peripheral device bus, wherein said structure further comprises:
        at least one logic device connected to said processor local bus; and
        at least one peripheral device connected to said peripheral device bus.

11. The structure in claim 10, wherein each of said channels includes buffer memories adapted to store data when a previous data transfer is being performed.

12. The structure in claim 11, wherein said buffer memories comprise first-in first-out buffer memories.

13. The structure in claim 10, wherein each of said channels includes a multi-port static random access memory (SRAM) adapted to store data when a previous data transfer is being performed.

14. The structure in claim 10, wherein each of said channels includes a multiplexor adapted to selectively connect to other channels.

15. The structure in claim 10, wherein said at least one memory unit comprises a first-type memory unit and a second-type memory unit different than said first-type memory unit, wherein said bridge includes a first channel is dedicated to said first-type memory unit and a second channel dedicated to said second-type memory unit.

16. The structure in claim 15, wherein said first-type memory unit comprises static random access memory (SRAM) and said second-type memory unit comprises synchronous dynamic random access memory (SDRAM).

17. The structure in claim 10, wherein said at least one input/output unit comprises one or more of a peripheral interface, graphics interface, and serial bus interface, and wherein said bridge includes unique dedicated channels for each of said peripheral interface, graphics interface, and serial bus interface.

18. The structure in claim 10, wherein said at least one peripheral device includes one or more of a serial connection, network interface connection, and programmable input/output connection each connected to said peripheral device bus.

19. A bridge for a system-on-a-chip (SoC) integrated circuit structure comprising:
   A plurality of dedicated channels in said bridge each uniquely connected to one or more of:
   At least one bus within said SoC;
   At least one memory unit within said SoC;
   At least one input/output unit within said SoC; and
   At least one peripheral device within said SoC;
   Wherein said at least one bus includes:
      A processor local bus connected to said bridge, wherein said bridge includes a first channel dedicated to said processor local bus; and
      A peripheral device bus connected to said bridge, wherein said bridge includes a second channel dedicated to said peripheral device bus, wherein said SoC includes:
      At least one logic device connected to said processor local bus; and
      At least one peripheral device connected to said peripheral device bus.

20. The structure in claim 19, wherein each of said channels includes buffer memories adapted to store data when a previous data transfer is being performed.

21. The structure in claim 20, wherein said buffer memories comprise first-in first-out buffer memories.

22. The structure in claim 19, wherein each of said channels includes a multi-port static random access memory (SRAM) adapted to store data when a previous data transfer is being performed.

23. The structure in claim 19, wherein each of said channels includes a multiplexor adapted to selectively connect to other channels.

24. The structure in claim 19, wherein said at least one memory unit comprises a first-type memory unit and a second-type memory unit different than said first-type memory unit, wherein said bridge includes a first channel is dedicated to said first-type memory unit and a second channel dedicated to said second-type memory unit.

25. The structure in claim 24, wherein said first-type memory unit comprises static random access memory (SRAM) and said second-type memory unit comprises synchronous dynamic random access memory (SDRAM).

26. The structure in claim 19, wherein said at least one input/output unit comprises one or more of a peripheral interface, graphics interface, and serial bus interface, and wherein said bridge includes unique dedicated channels for each of said peripheral interface, graphics interface, and serial bus interface.

27. The structure in claim 19, wherein said at least one peripheral device includes one or more of a serial connection, network interface connection, and programmable input/output connection each connected to said peripheral device bus.

* * * * *